US006945109B2

(12) United States Patent
Renault et al.

(10) Patent No.: US 6,945,109 B2
(45) Date of Patent: Sep. 20, 2005

(54) HEMISPHERICAL RESONATOR WITH DIVIDED SHIELD ELECTRODE

(75) Inventors: Alain Renault, Pontoise (FR); Paul Vandebeuque, Argenteuil (FR)

(73) Assignee: Sagem Defense Securite, Paris (FR)

( * ) Notice: Subject to any disclaimer, the term of this patent is extended or adjusted under 35 U.S.C. 154(b) by 0 days.

(21) Appl. No.: 10/772,254

(22) Filed: Feb. 6, 2004

(65) Prior Publication Data

US 2004/0154396 A1 Aug. 12, 2004

(30) Foreign Application Priority Data

Feb. 6, 2003 (FR) ........................................... 03 01382

(51) Int. Cl.[7] .................................................. G01P 9/04
(52) U.S. Cl. .................................................... 73/504.13
(58) Field of Search ......................... 73/504.13, 504.04, 73/504.12, 504.14, 504.15, 1.37, 1.38, 1.75, 1.77, 1.78

(56) References Cited

U.S. PATENT DOCUMENTS

| | | | | | |
|---|---|---|---|---|---|
| 4,157,041 | A | * | 6/1979 | Loper et al. | 73/504.13 |
| 4,951,508 | A | | 8/1990 | Loper, Jr. et al. | |
| 6,474,161 | B1 | * | 11/2002 | Jeanroy et al. | 73/504.13 |

FOREIGN PATENT DOCUMENTS

| | | |
|---|---|---|
| FR | 2 792 722 | 10/2000 |

* cited by examiner

*Primary Examiner*—Helen Kwok
(74) *Attorney, Agent, or Firm*—Young & Thompson

(57) ABSTRACT

The hemispherical resonator comprises a bell fixed to a base which carries main electrodes extending in register with an edge of the bell, and a shield electrode subdivided into two portions each presenting auxiliary electrodes extending in regular manner between the main electrodes.

4 Claims, 1 Drawing Sheet

HEMISPHERICAL RESONATOR WITH DIVIDED SHIELD ELECTRODE

The present invention relates to a hemispherical resonator for use as an inertial rotation sensor.

BACKGROUND OF THE INVENTION

French patent document FR-A-2 792 722 discloses a hemispherical resonator comprising a metallized bell-shaped vibrating member fixed on a base which carries main electrodes extending facing an edge of the bell and a shield electrode adjacent to the main electrodes.

The main electrodes serve firstly to set the bell into vibration by applying at least one alternating voltage to the main electrodes while also maintaining the bell at constant potential, and secondly to detect vibration of the bell by picking up a detection signal from the main electrodes.

In that embodiment, the shield electrode is grounded and serves to reduce cross-talk between the electrodes.

OBJECT OF THE INVENTION

Under some circumstances, in particular when the resonator is used in free gyro mode with a DC quadrature control signal, it would nevertheless be desirable to be able to increase the number of electrodes while minimizing the number of connections needed for controlling the electrodes.

BRIEF DESCRIPTION OF THE INVENTION

According to the invention, a hemispherical resonator of the type described in the above-specified document is proposed in which the shield electrode is divided into at least two portions, each presenting auxiliary electrodes extending between the main electrodes.

Thus, the shield electrode may be used either in its usual function by putting both portions to ground, or else it may be as a control and/or detection electrode by applying suitable signals to each of the portions of the shield electrode.

In an advantageous embodiment of the invention, the shield electrode comprises a first portion in the form of a central disk from which the auxiliary electrodes extend radially outwards, and a second portion in the form of a ring which extends around the main electrodes and from which the auxiliary electrodes extend radially inwards. The auxiliary electrodes belonging to each of the portions of the shield electrode preferably extend between the main electrodes in regular alternation.

BRIEF DESCRIPTION OF THE DRAWINGS

Other characteristics and advantages of the invention appear on reading the following description of a particular embodiment of the invention given with reference to the accompanying figures, in which.

DETAILED DESCRIPTION OF THE INVENTION

Figure 1:
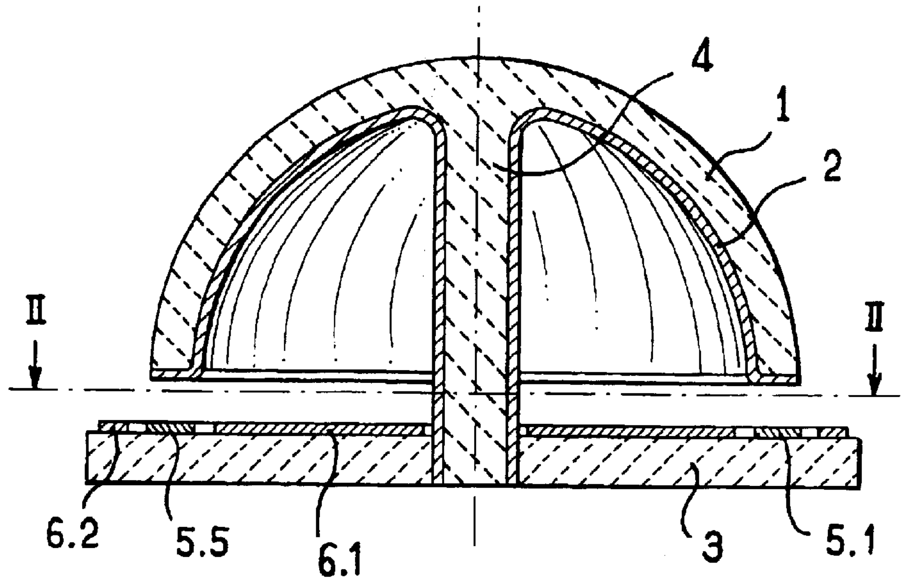
FIG. 1 is an axial section view of the resonator on line I—I of FIG. 2.

For a better understanding of the invention, the resonator is shown on a scale much larger than life size with the thicknesses of the electrodes and the width of the airgap being exaggerated.

In the embodiment shown, the resonator comprises in conventional manner a hemispherical vibrating member 1, e.g. a bell made of silica and fixed to a base 3 by means of a rod 4. The inside surface of the bell 1 and the edge thereof and the surface of the rod are covered in a layer of metal 2. The base 3 carries main electrodes given overall numerical reference 5 and individual numerical references 5.1, 5.2, . . . , 5.8 enabling them to be identified individually. The electrodes 5 extend facing the edge of the vibrating member 1.

In the embodiment shown, the resonator also comprises a shield electrode given overall reference 6, and which, in accordance with the invention, is subdivided into two portions 6.1 and 6.2 each presenting four auxiliary electrodes, given overall numerical reference 7 with individual numerical references 7.1 for the auxiliary electrodes of the portion 6.1 and 7.2 for the auxiliary electrodes of the portion 6.2. The electrodes 7.1 and 7.2 extend in alternation between the electrodes 5. The portion 6.1 of the shield electrode is constituted by a central disk from which the auxiliary electrodes 7.1 extend radially outwards, while the portion 6.2 of the shield electrode is constituted by a circular ring extending around the main electrodes 5 and from which the auxiliary electrodes 7.2 extend radially inwards.

For operation in rate gyro mode, the two portions 6.1 and 6.2 of the shield electrode are both grounded and the amplitude control signals, precession control signals, and quadrature control signals are applied in the various ways that are known in themselves.

For operation in free gyro mode, i.e. operation involving only an amplitude control signal and a quadrature control signal, it is preferable to apply the quadrature control signal in the form of a DC amplitude modulated signal in order to minimize drift of the resonator. Under such circumstances, quadrature control is effective only insofar as the quadrature control signal is subjected to cross-modulation that results from variation of the airgap facing the control electrode to which the quadrature control signal is applied, i.e. insofar as the vibration to which the bell is subjected does not present a node that coincides with the electrode to which the quadrature control signal is applied.

Figure 2:
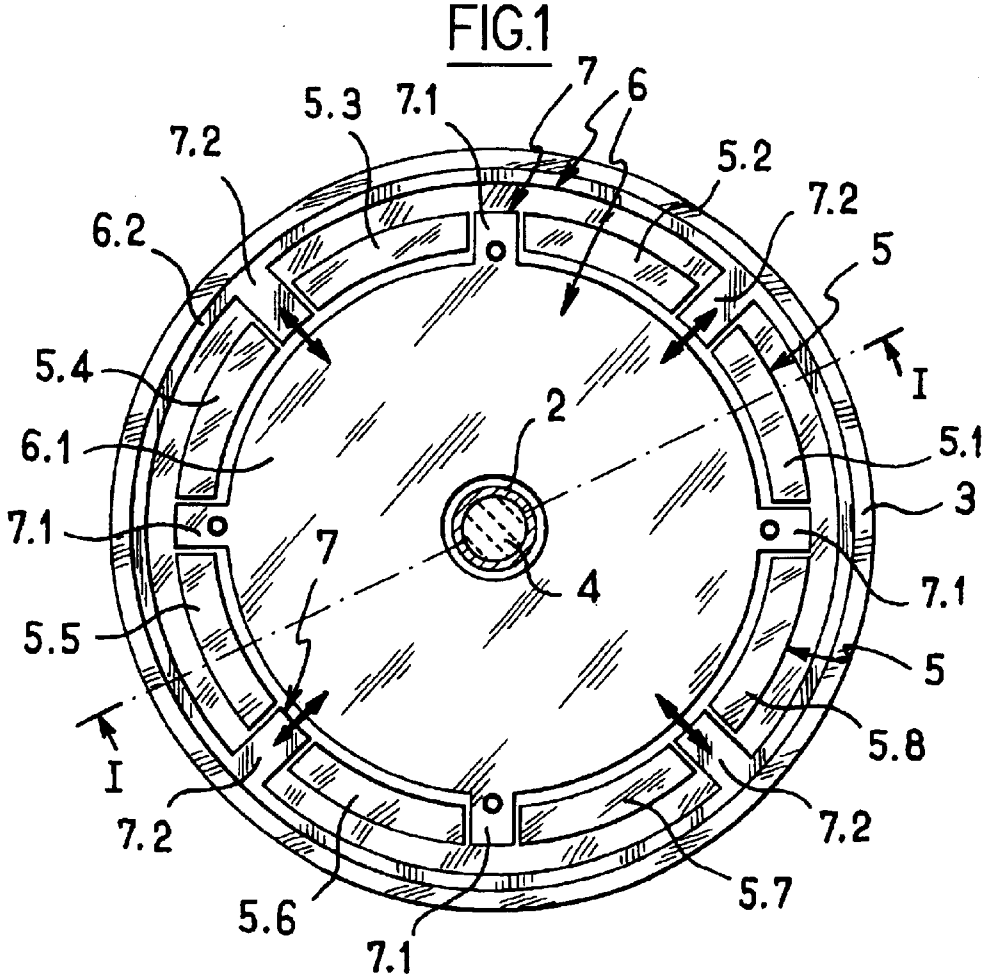
FIG. 2 is a plan view of the electrodes of the resonator in section on line II—II of FIG. 1.

Nevertheless, in free gyro mode, the orientation of the vibration varies as a function of the rotation to which the resonator is subjected. Assuming that the initial amplitude control signal is applied so as to orient the vibration as shown in FIG. 2, i.e. with the vibration antinodes in the gaps between the electrodes 5.1 & 5.2, 5.3 & 5.4, 5.5 & 5.6, and 5.7 & 5.8, as represented by bold double-headed arrows in the figure, with the nodes simultaneously occupying the gaps between electrodes 5.2 & 5.3, 5.4 & 5.5, 5.6 & 5.7, and 5.8 & 5.1, as represented by small bold circles in FIG. 2, this orientation will not remain constant when the resonator is subjected to rotation. In particular, when starting from the position shown, the resonator is subjected to movement causing the vibration to turn clockwise, the node which was initially between the electrodes 5.2 & 5.3 will move until this node comes close to the middle of electrode 5.2. In this situation, the quadrature control applied to the electrode 5.2 ceases to be effective. The resonator having the structure of the invention makes it possible to avoid this loss of effectiveness by applying the control signal in alternation to the main electrodes and to the auxiliary electrodes.

By way of non-limiting example, the description starts from the situation where the resonator is initially operated by applying an amplitude control signal CA to the main electrodes 5.1, 5.2, 5.5, and 5.6. While the resonator is being set into vibration, the amplitude control signal CA is applied at the resonant frequency of the bell 1 to the four above-mentioned main electrodes which are modally in quadrature, such that the bell 1 enters into vibration in the orientation shown in FIG. 2 and described above. During a sustaining stage it is possible to cause the amplitude control signal CA to go to a frequency that is twice the resonant frequency. For operation in free gyro mode, a DC quadrature control signal CQ is applied in combination with the amplitude control signal. In the example described, a signal CA−CQ is applied to the electrodes 5.1 and 5.5 while a signal CA+CQ is applied to the electrodes 5.2 and 5.6. When the resonator is subjected to movement as described above, so that the vibration node coincides with the middle of the electrode 5.2, i.e. so that the airgap in register with the electrode 5.2 is no longer subjected to variation, cross-modulation of the quadrature signal disappears and it therefore loses its effectiveness. By using the resonator structure of the invention, this loss of effectiveness is avoided by then switching the signal CA−CQ to the portion 6.1 of the shield electrode and the signal CA+CQ to the portion 6.2 of the shield electrode. The node in register with the main electrode 5.2 is then halfway between the auxiliary electrodes 7.1 and 7.2 which are respectively subjected to the signals CA−CQ and CA+CQ. The airgaps in register with the auxiliary electrodes 7.1 and 7.2 are therefore varying so that the quadrature control signal is subjected to cross-modulation. Quadrature control therefore becomes fully effective.

By using the particular structure of the invention, the control signals are thus applied in alternation to the main electrodes 5 and to the secondary electrodes 7 as vibration turns so as to maintain the vibration nodes between the electrodes to which the quadrature control signal is applied.

Naturally, the invention is not limited to the embodiment described and variants thereto will appear to the person skilled in the art without going beyond the ambit of the invention as defined by the claims.

In particular, although implementation of the invention is described with reference to applying a control signal to only four electrodes, it is possible to perform control and detection with multiplexing, thus making it possible to increase the dynamic range of control and of detection. It is also possible to make use simultaneously of eight electrodes in control and in detection by applying the amplitude control signal CA to the bell at a frequency which is twice the resonant frequency and by applying the amplitude control signal CA to the bell at a frequency which is twice the resonant frequency and by applying a DC quadrature control signal to the eight active electrodes.

Although the shield electrode is shown as being divided into two portions only, it is possible in particular applications to make provision for the shield electrodes to be divided into more than two portions, thus making it possible to provide a greater distinction between the control signals on the auxiliary electrodes.

Similarly, although the invention is shown with a resonator comprising only eight main electrodes, it is possible to make a resonator having some larger number of main electrodes, the auxiliary electrodes then being interposed in the same manner between the main electrodes by subdividing the shield electrode into a plurality of portions.

What is claimed is:

1. A hemispherical resonator comprising a bell fixed on a base which carries main electrodes extending in register with an edge of the bell, and a shield electrode adjacent to the main electrodes, the shield electrode comprising at least a central portion from which auxiliary electrodes extend radially outward and a peripheral portion from which the auxiliary electrodes extend radially inward.

2. The resonator according to claim 1, wherein the central portion is a central disk from which the auxiliary electrodes extend radially outwards, and a the peripheral portion is a ring which extends around the main electrodes and from which the auxiliary electrodes extend radially inwards.

3. The resonator according to claim 1, wherein the auxiliary electrodes belonging to each of the central and peripheral portions of the shield electrode extend between the main electrodes in regular alternation.

4. The resonator according to claim 1, wherein the central portion is a disk and the peripheral portion is a ring surrounding the central portion.

* * * * *